Patented Jan. 16, 1951

2,538,721

UNITED STATES PATENT OFFICE 2,538,721

PENICILLIN PRODUCTION

Donald R. Colingsworth, Kalamazoo, Mich., assignor to The Upjohn Company, Kalamazoo, Mich., a corporation of Michigan No Drawing. Application March 2, 1949,
Serial No. 79,299

12 Claims. (Cl. 195—36)

This invention relates to a process for the production of penicillin and is more particularly concerned with the production of penicillin in the presence of esters of long-chain fatty acids or naturally occurring oils containing the said esters, the said acid esters or oils being added to the penicillin fermentation medium prior to the start of the fermentation or early in the fermentation cycle.

Many and various methods have already been suggested for increasing the production of penicillin, and, in particular, penicillin G, due to the desirable therapeutic properties possessed thereby. Among the methods previously proposed are those which include incorporating, in the fermentation medium, certain organic stimulants, precursors, or adjuvants which appear to enhance the production of penicillin, and especially penicillin G, thereby increasing the amount obtainable from a particular fermentation culture.

It is an object of the present invention to provide a method whereby penicillin, in particular penicillin G, may be produced in increased amounts over that produced by the submerged culture of members of the *Penicillium chrysogenum-notatum* group in the absence of the novel growth stimulants of the present invention. It is a further object of the present invention to provide a novel group of adjuvants which are useful in such capacity either alone or together with previously known growth stimulants for increasing the production of penicillin. An additional object of the invention is the provision of a novel process for the production of penicillin which involves the use of esters of long-chain fatty acids, or naturally occurring oils containing the same, as growth stimulants, whereby the amount of penicillin, especially penicillin G, obtainable from a particular fermentation culture, which may or may not include previously known chemical growth stimulants, adjuvants and/or precursors, is greatly increased. Other objects of the invention will become apparent hereinafter.

It has been observed that, unexpectedly, when a small amount of an ester of a long-chain fatty acid is added to a penicillin fermentation medium, either prior to inocculation with a penicillin-producing culture or during the first one-third of the fermentation period after inoculation, an increase of up to about 500 units of penicillin per milliliter of beer is obtained over that which is possible using prior art procedure. The procedure of the present invention, moreover, does not result in a diminution of the percentage production of penicillin G, calculated on a basis of the total penicillin produced. Thus, if using prior art procedures, it is possible to obtain 700 units of penicillin per milliliter of beer, of which 70 percent is penicillin G, or 490 units of penicillin G, it is possible, using the procedure of this invention, to obtain approximately 1200 units of penicillin per milliliter of beer, of which at least 70 percent of the penicillin is penicillin G, or 840 units of penicillin G per milliliter of beer. Not only is the total amount of penicillin produced per milliliter of beer increased, but the amount of penicillin G produced per milliliter of beer is far greater.

While esters of long-chain fatty acids, in the form of naturally occurring oils containing the same, have already been used in some prior art procedures for penicillin production, these have been employed previously only as anti-foam agents during the late stages of the fermentation cycle, and have thus entirely escaped attention as possible growth stimulants for penicillin production. Elaborate arrangements have, in fact, been devised to preclude the addition of such anti-foam agents until after the foaming had reached an undesirable level, which ordinarily occurs only during the latter stages of the fermentation cycle, and at which time the production of the penicillin is substantially complete. An example of such an arrangement is shown by Stefaniak et al. in Ind. Eng. Chem. 38, 666 (1946), who describe an electrode device connected to external valves, with the electrode located so that, when the foam reaches a predetermined level, the valves are opened, allowing addition of anti-foam agent until the excessive foaming has subsided. Such an arrangement is presently used in industry for the control of foaming in penicillin fermentation cultures. However, to the best of my knowledge, it has never been suggested to add esters of long-chain fatty acids, or oils containing the same, and particularly esters of unsaturated acids, to a penicillin culture medium during the first one-third of the fermentation cycle or at any time during the penicillin fermentation cycle, at which a growth stimulant effect could possibly be produced by such addition, or that such esters or oils would have any stimulating action whatsoever on the growth and productivity of the pencillin fermentation culture. In fact, published results of tests made using lard oil, corn oil, and soya bean oil, which are representative oils containing esters of long-chain fatty acids, as anti-foam agents, show no stimulant effect on the penicillin fermentation concerned, and thus the valuable result obtained by the method of the present invention is all the more unexpected.

The invention will be particularly described with respect to the naturally occurring oils, lard oil and corn oil, which contain a high unsaturated long-chain fatty acid ester content as the glyceryl esters thereof. Other oils having a high long-chain fatty acid ester content, such as olive oil, lard oil, corn oil, peanut oil, sesame oil, and refined soya bean oil, as well as methyl oleate, propyl oleate, glyceryl monooleate, glyceryl trioleate, the glyceryl esters of palmitoleic, linoleic, linolenic, arachidonic, myristoleic, rincinoleic, gadoleic, erucic, and various other alcohol esters of the foregoing acids are also effective agents for the stimulation of penicillin production. Esters of saturated fatty acids, such as lauric, myristic and palmitic acids, and naturally occurring oils containing the same in substantial amounts, are also effective stimulants according to the method of the present invention. In order to obtain the most advantageous results, it is desirable that naturally occurring oils containing a relatively large amount of unesterified acids be modified to change the free acids to their esters, as the free acids appear to detract somewhat from the effectiveness of the esters. By "long-chain fatty acid," as used in this specification and the appended claims, is intended any naturally occurring fatty acid, particularly those containing from eight to twenty-four carbon atoms, inclusive.

Prime burning lard oil, which is one of the preferred adjuvants in the practice of this invention, is a colorless or yellow oil having a bland taste, a specific gravity of about 0.915, a saponification value of 190–200, an iodine number of 55 to 75, and containing 0.2–0.5 percent free fatty acids, more than ninety percent triglycerides and some mono- and diglycerides. Corn oil, which is another preferred adjuvant in the practice of this invention, is obtained by pressing the germ of common corn, and is a pale yellow liquid having a specific gravity of about 0.920 to 0.925, a saponification value of 185–195, an iodine number of 110 to 125, and is largely composed of glyceryl esters of fatty acids. The average fatty acid composition of these oils, measured after saponification, is:

| Acid | Percent | |
|---|---|---|
| | Lard Oil | Corn Oil |
| Myristic | 1.0 | |
| Palmitic | 20.0 | 7.5 |
| Stearic | 10.0 | 3.5 |
| Oleic | 58.0 | 46.0 |
| Linoleic | 10.0 | 42.0 |
| Linolenic | 0.5 | |
| Arachidonic | 0.5 | |

The method of the present invention, then, comprises, in addition to the conventional procedure for the production of penicillin, the step of adding to the penicillin fermentation medium an ester of a long-chain fatty acid, or an oil containing such esters, specifically an oil of the group consisting of lard oil, corn oil, and mixtures thereof, in amount above on-tenth of one percent by volume of the fermentation medium either before inoculation of the medium with a member of the *Penicillium chrysogenum-notatum* group, or during the first one-third of the fermentation period. The fermentation, except for the addition of an ester, is carried out in the usual manner with or without the use of other known chemical stimulants, and no other changes need be made. Anti-foam agents are still required in the later fermentation stages, as it is not the purpose of the present invention to prevent foaming, but rather to provide a method for increasing penicillin production.

Conventional penicillin production procedure involves inoculating a suitable fermentation medium with a sufficient quantity, in most instances about five percent by volume, of a culture of a member of the *Penicillium chrysogenum-notatum* group; aerating the medium with sterile air and stirring while conducting the fermentation at a suitable temperature; adding an anti-foam agent as foam develops in the latter stages of the fermentation; filtering the mycelium from the beer; and subsequently isolating the penicillin produced. The composition of the fermentation medium does not appear to be critical, but it is usually desirable that the medium contain carbohydrates as a source of carbon, milk sugar and corn sugar being preferred; the solids contained in corn steep liquor; an additional source of nitrogen, either of protein origin such as beef extract or peptone, or inorganic in nature such as sodium nitrate, ammonium nitrate or other nitrogen-containing salts; acid neutralizing or buffering agents, such as calcium carbonate or monopotassium phosphate, to prevent the pH of the fermentation from exceeding the desired limits; small amounts of essential inorganic salts such as magnesium sulfate or zinc sulfate; and various organic chemical substances such as N-(hydroxyethyl)-phenylacetamide or N-methylphenylacetamide. The term "nutrient material" as used herein, may include or omit these organic substances although a preferred embodiment of the invention contemplates their use.

For submerged culture, the medium containing these ingredients is dissolved in a sufficient quantity of water sterilized by heating to a temperature of about 250 degrees Fahrenheit for thirty minutes and an inoculum, amounting to about five percent by volume of the medium, of a member of the *Penicillium chrysogenum-notatum* group, usually grown on a lactose-corn steep medium, is then added. For simplicity of operation, it is preferred to add at least 0.1 percent, and preferably, between about one-half and two percent, by volume of the culture medium of an ester of a long-chain fatty acid to the medium prior to sterilization and inoculation, although the addition may be made with facility at any time during the first one-third of the fermentation. The fermentation is then carried out at a pre-selected temperature, usually between 75 and 85 degrees centigrade, with sterile air being added to the medium, if desired, at a suitable rate, preferably between about 100 and 150 cubic feet per minute, if the fermentation is carried out in a 5000-gallon tank. During the fermentation the medium is also preferably agitated, the speed of the agitator depending upon its construction, but being generally between 110 and 125 revolutions per minute, when a curved blade turbine-type agitator is used.

The fermentation may be conducted for a total period of 60 to 120 hours, periods of from 65 to 96 hours being preferred. The appearance of foam in an amount such as to require appreciable quantities of anti-foam agent does not usually occur until the fermentation has proceeded for at least about forty hours. As the fermentation proceeds, the amount of foam produced increases, and the quantity of anti-foam agent added is likewise increased, with about 75 percent of the amount used being added during the last 24 hours of the fermentation period.

It is to be understood that, while many of these details are subject to considerable variation, the critical part of the procedure, according to the method of this invention, is the addition of the ester either before the inoculation of the culture medium with an organism of the *Penicillium chrysogenum-notatum* group, or, alternatively, in the early stages of the fermentation i. e., before the appearance of foam. The amount by which the yield of penicillium is increased is to a certain extent dependent upon the length of time that the fermentation has proceeded during the first one-third of the fermentation cycle before esters are added. It is necessary to add the growth and penicillin-stimulating quantities of the ester no later than the end of the first one-third of the fermentation period, preferably before the end of 24 hours, as after this point the addition serves little or no useful stimulating purpose, and addition of the ester to the medium before sterilization and inoculation, is, as previously stated, a preferred embodiment of this invention.

It has been found that a quantity of the long-chain fatty acid ester amounting to at least one-tenth percent of volume of culture medium must be added in order to obtain the exceptional results which are possible according to the method of the present invention. More than this quantity may be added, but since the addition, in accordance with the method of the present invention, of two percent shows no additional advantage over the use of one percent, addition of more than one percent is not economical and is therefore not desirable. A preferred embodiment contemplates the use of between 0.5 and 1.0 percent of the ester. It is not desirable to add more than about five percent of the ester, since such amounts render separation of the penicillin from the beer undesirably difficult.

While the exact mechanism of the present process is not definitely known, its explanation appears to reside in the pH control. The penicillin-producing organisms apparently produce penicillin as long as the pH of the medium remains below about 7.8, but, as soon as the pH of the medium rises above approximately 7.5, the pH of the solution rises rapidly to a pH above 7.8, thereby terminating the penicillin production. When the adjuvants of the present invention are incorporated into the medium before this rise in pH or immediately after the pH has started to rise, the organisms appear to release the acid from its ester, thereby lowering the pH of the medium, and obviating this undesirable termination. Moreover, there is some basis for belief that the organisms accept the residual acid as food.

When the fermentation was conducted in 5000-gallon tanks with esters of long-chain fatty acids being added only during the latter stages of the fermentation as an anti-foam agent, the average yield of penicillin produced in five such fermentations was 723 units per milliliter. When the fermentation was conducted as described herein in 5000-gallon tanks with the addition of 0.9 percent lard oil and/or corn oil to the fermentation medium prior to inoculation or at various periods during the first one-third of the fermentation, the average yield of penicillin obtained in 63 such fermentations was 1273 units per milliliter. Thus, the average increase in penicillin production using the method of this invention amounted to an average of 550 units per milliliter of beer, an increase of great commercial significance.

The following examples are given to illustrate the practice of the present invention, but are not to be construed as limiting.

*Prior art procedure*

Five fermentations were conducted in 5000-gallon quantities using conventional prior art technique. The culture medium in every instance was the same, but the manner of treating the fermentation was varied to a negligible extent.

A culture of *Pencillium chrysogenum*-Q-176, grown on a lactose-corn steep medium was added in an amount of five percent by volume to a 5000-gallon fermentation tank containing per liter: crude milk sugar 25.0 grams, corn sugar 5.0 grams, sodium nitrate 6.0 grams, calcium carbonate 10.0 grams, monopotassium phosphate 1.0 gram, magnesium sulfate 0.5 gram, zinc sulfate 0.05 gram, N-(hydroxyethyl)-phenylacetamide 0.75 gram, corn steep solids 40.0 grams, and tap water Q. S. The fermentation was conducted at 77±1 degrees Fahrenheit, sterile air introduced into the bottom of the beer at a rate of one hundred cubic feet per minute, the beer stirred with a turbine-type agitator at a rate of 118 revolutions per minute, and each fermentation allowed to proceed for from 88 to 95 hours. Lard oil containing one percent octadecanol was added by an automatic device as foam appeared during the fermentation. The total quantity of anti-foam agent added from the first appearance of the foam to the cessation of the fermentation was between four and seven milliliters per liter of the medium, with by far the greatest part being added during the last 24 hours of fermentation. The average concentration of penicillin in the beer obtained from five such fermentations was 723 units per milliliter, containing between 70 and 90 percent of penicillin G. The penicillin contained in the beer was isolated and purified by conventional procedure.

*Composite example*

Sixty-three fermentations were carried out in 5000-gallon quantities. The culture medium was of the same composition as that of the foregoing example, except that in some instances lard oil, in some instances corn oil, and in some instances mixtures of the two were added in amount between five milliliters and ten milliliters per liter of medium before inoculation of the medium with the pencillin-producing culture. The medium was thereafter inoculated with five percent by volume of a culture of *Pencillium chrysogenum*-Q-176 grown on a lactose-corn steep medium. The fermentation was conducted at 82 (±1) degrees Fahrenheit, with aeration at the rate of 150 cubic feet per minute, and stirring as described in the preceding example, over a period of 88–96 hours, for each fermentation. Lard oil containing one percent octadecanol was added by an automatic device as foam appeared, as in the foregoing example, the amount required being four to seven milliliters per liter of medium. The average concentration of penicillin in the beer obtained from 63 such fermentations was 1273 units per milliliter, having a penicillin G percentage between 70 and 90 percent. The product was then isolated and purified by conventional procedure.

A similar improvement in yield of penicillin was obtained when other strains of *Penicillium chrysogenum*, such as X-1612, N R R L 1951-B 25, and *Penicillium notatum* N R R L 832, as well as other species and strains of pencillin-producing Penicillium were used.

Various modifications may be made in the method of the present invention without departing from the spirit or scope thereof, and it is to be understood that I limit myself only as defined in the appended claims.

I claim:

1. The method of producing pencillin in submerged culture, which comprises: growing a pencillin-producing Penicillium mold in a culture medium containing an ester of a long-chain fatty acid in an amount greater than about 0.5 percent by volume of the nutrient medium, said ester being incorporated with the culture medium prior to the end of the first 24 hours of the fermentation period.

2. In the process for the production of penicillin by the submerged fermentation, in a nutrient medium, of an organism of the *Penicillium chrysogenum-notatum* group, the improvement whereby the yield of penicillin is increased, which comprises: incorporating in the nutrient medium prior to the completion of the first 24 hours of the fermentation, an ester of a long-chain fatty acid in an amount in excess of approximately 0.5 percent by volume of the nutrient medium.

3. The method of producing penicillin in a submerged culture, which comprises: growing a penicillin-producing Penicillium mold in a culture medium containing an ester of a long-chain fatty acid in an amount greater than 0.5 percent by volume of the nutrient medium, said ester being added no later than the first twenty-four hours of the fermentation period.

4. In a method for the production of penicillin in submerged culture by growing a Penicillium mold of the *notatum-chrysogenum* group in a nutrient medium, the improvement which comprises: incorporating the nutrient material, before the end of the first 24 hours of the fermentation period, an effective amount of lard oil, in excess of 0.5 percent by volume of the nutrient medium.

5. In a method for the production of penicillin in submerged culture by growing a Penicillium mold of the *notatum-chrysogenum* group in a nutrient medium, the improvement which comprises: incorporating in the nutrient material, prior to association with the Penicillium mold, an effective amount greater than 0.5 percent by volume of the nutrient medium, of lard oil.

6. In a method for the production of penicillin in submerged culture by growing a Penicillium mold of the *notatum-chrysogenum* group in a nutrient medium, the improvement which comprises: incorporating in the nutrient material, before the end of the first 24 hours of the fermentation period, an effective amount of corn oil, in excess of 0.5 percent by volume of the nutrient medium.

7. In a method for the production of penicillin in submerged culture by growing a Penicillium mold of the *notatum-chrysogenum* group in a nutrient medium, the improvement which comprises: incorporating in the nutrient material, prior to association with the Penicillium mold, an effective amount greater than 0.5 percent by volume of the nutrient medium of corn oil.

8. In a method for the production of penicillin in submerged culture by growing a Penicillium mold of the *notatum-chrysogenum* group in a nutrient medium, the improvement which comprises: incorporating in the nutrient material, before the end of the first 24 hours of fermentation period, an effective amount of a mixture of lard oil and corn oil, in excess of one-tenth percent by volume of the nutrient medium.

9. In a method for the production of penicillin in submerged culture by growing a Penicillium mold of the *notatum-chrysogenum* group in a nutrient medium, the improvement which comprises: incorporating in the nutrient material, prior to association with the Penicillium mold, an effective amount greater than 0.5 percent by volume of the nutrient medium of a mixture of lard oil and corn oil.

10. The method of producing penicillin in submerged culture, which comprises: growing a penicillin-producing Penicillium mold in a culture medium containing an ester of an eight to twenty-four carbon atom unsaturated fatty acid in an amount greater than 0.5 percent by volume of the nutrient medium, said ester being incorporated with the culture medium prior to the end of the first 24 hours of the fermentation period.

11. The method of producing penicillin in submerged culture, which comprises: growing a *Penicillium chrysogenum-notatum* organism in a culture medium containing an ester of a long-chain fatty acid, in an amount between 0.5 percent and 2.0 percent by volume of the culture medium, said ester being incorporated with the culture medium prior to inoculation with said organism.

12. The method of producing penicillin in submerged culture, which comprises: growing a *Penicillium chrysogenum-notatum* organism in a culture medium containing a glyceryl ester of a long-chain fatty acid in an amount of about 0.9 percent by volume of the culture medium, said ester being incorporated with the culture medium prior to inoculation with said organism.

DONALD R. COLINGSWORTH.

REFERENCES CITED

The following references are of record in the file of this patent:

UNITED STATES PATENTS

| Number | Name | Date |
|---|---|---|
| 2,458,495 | Foster | Jan. 11, 1949 |

OTHER REFERENCES

Penicillin Research Progress Report, No. 9, July 22, 1944, University of Wisconsin, O. P. R. D. Contract 118, pages 4 and 5.

Ibidum, Report No. 6, May 27, 1944, pages and 2.